(12) United States Patent
Park et al.

(10) Patent No.: US 7,133,708 B2
(45) Date of Patent: Nov. 7, 2006

(54) TRIPLE-AXIS ROTATION TYPE HEADSET

(75) Inventors: Jun-Sang Park, Anyang-shi (KR); Chang-Soo Lee, Inchonkwangyok-shi (KR); Seung-Min Park, Seoul (KR); Sung-Kwon Kim, Seoul (KR); Jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 272 days.

(21) Appl. No.: 10/771,754

(22) Filed: Feb. 4, 2004

(65) Prior Publication Data

US 2004/0157581 A1    Aug. 12, 2004

(30) Foreign Application Priority Data

Feb. 7, 2003    (KR)    ................... 10-2003-0007705

(51) Int. Cl.
    *H04M 1/00*    (2006.01)
(52) U.S. Cl. .................................. 455/575.2
(58) Field of Classification Search ........... 455/344, 455/575.2, 569.1
    See application file for complete search history.

(56) References Cited

U.S. PATENT DOCUMENTS 5,134,655 A    7/1992    Jensen
6,101,260 A    8/2000    Jensen et al.
2002/0110249 A1    8/2002    Jeon et al.

FOREIGN PATENT DOCUMENTS

| DE | 200 16 465 | 9/2000 |
| WO | WO 03/005767 | 1/2003 |

*Primary Examiner*—William D. Cumming
(74) *Attorney, Agent, or Firm*—Dilworth & Barrese, LLP

(57) ABSTRACT

A triple-axis rotation type headset is described herein that preferably uses a Bluetooth™ module in a main housing that has a first hinge axis longitudinally extended therethrough, and has a rotating housing rotatably attached to the main housing. The rotating housing is rotated about the first hinge axis. To the rotating housing is rotatably attached a connecting member having a second hinge axis longitudinally extended therethrough. The connecting member is rotated about the second hinge axis. The second hinge axis is spaced apart from the first hinge axis. The headset further comprises a hanging member having a third hinge axis provided at one end thereof. The end of the hanging member is rotatably attached to one end of the connecting member about the third hinge axis. The third hinge axis is perpendicular to the second hinge axis. The triple-axis rotation type headset provides improved contact between the headset and an ear of a user of the headset, and convenient key manipulation.

9 Claims, 4 Drawing Sheets

TRIPLE-AXIS ROTATION TYPE HEADSET

PRIORITY

This application claims priority to an application entitled "TRIPLE-AXIS ROTATION TYPE HEADSET", filed in the Korean Industrial Property Office on Feb. 7, 2003 and assigned Serial No. 2003-7705, the contents of which are hereby incorporated by reference.

BACKGROUND OF THE INVENTION

1. Field of the Invention

The present invention relates to a wireless headset using a Bluetooth™ module, and more particularly to a triple-axis rotation type wireless headset that is capable of rotating about its three axes so that it makes close contact to an ear of a user of the headset.

2. Description of the Related Art

Generally, a wireless headset using a Bluetooth™ module is a device which is worn on an ear of a user of the headset while not being connected with another communication device by a wire to communicate with a third party. In recent years, a wireless headset has been adapted to wirelessly transmit/receive an audio signal to/from a main communication device using a Bluetooth™ module, which is a short-range wireless transmitting and receiving unit.

A conventional wireless headset for transmitting and receiving an audio signal is fully disclosed in Korean Patent Application No. 2001-006391 entitled "HINGE UNIT FOR HEADSET HAVING CURRENT CARRYING MEANS," which has been filed in the name of the same applicant, and in U.S. patent Ser. No. 09/951,257, publication no. 20020110249, entitled "HINGE UNIT FOR HEADSET HAVING CURRENT-CARRYING MEANS," which has been assigned to Samsung Electronics Co., LTD. The conventional wireless headset comprises two housings: one for a speaker and the other for a microphone. The two housings are rotated relative to each other about a hinge shaft so that the headset is put on an ear of a user of the headset. In addition, an elastic member, such as a sponge, is attached to the conventional headset to ensure comfortable contact between the ear of the user and the headset.

However, the conventional headset has a disadvantage in that the contact between the ear of the user and the headset is not tight since it has only a single hinge shaft, about which the two housings are rotatably attached to each other. Generally, it is required that the speaker is arranged close to the ear of the user and the microphone is arranged close to a mouth of the user. It is also required that the headset further comprises an additional hanging member, which is hung on the ear of the user, to improve a degree of contact between the ear of the user and the headset.

SUMMARY OF THE INVENTION

Therefore, the present invention has been made in view of the above problem, and it is an object of the present invention to provide a headset that is capable of rotating about its three axes so that it makes close contact to an ear of a user.

It is another object of the present invention to provide a headset that is capable of accomplishing convenient key manipulation while the headset is worn on an ear of a user.

It is yet another object of the present invention to provide a headset that is capable of providing a sense of stability to a user of the headset while the headset is worn on an ear of the user.

In accordance with the present invention, the above and other objects can be accomplished by the provision of a triple-axis rotation type wireless headset using a Bluetooth™ module, comprising: a main housing having a first hinge axis longitudinally extended therethrough; a rotating housing rotatably attached to the main housing, the rotating housing being rotated about the first hinge axis; a connecting member rotatably attached to the rotating housing, the connecting member having a second hinge axis longitudinally extended therethrough, the connecting member being rotated about the second hinge axis, the second hinge axis being spaced apart from the first hinge axis; and a hanging member having a third hinge axis provided at one end thereof, the end of the hanging member being rotatably attached to one end of the connecting member about the third hinge axis, the third hinge axis being perpendicular to the second hinge axis.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted to avoid making the subject matter of the present invention unclear.

Figure 1:
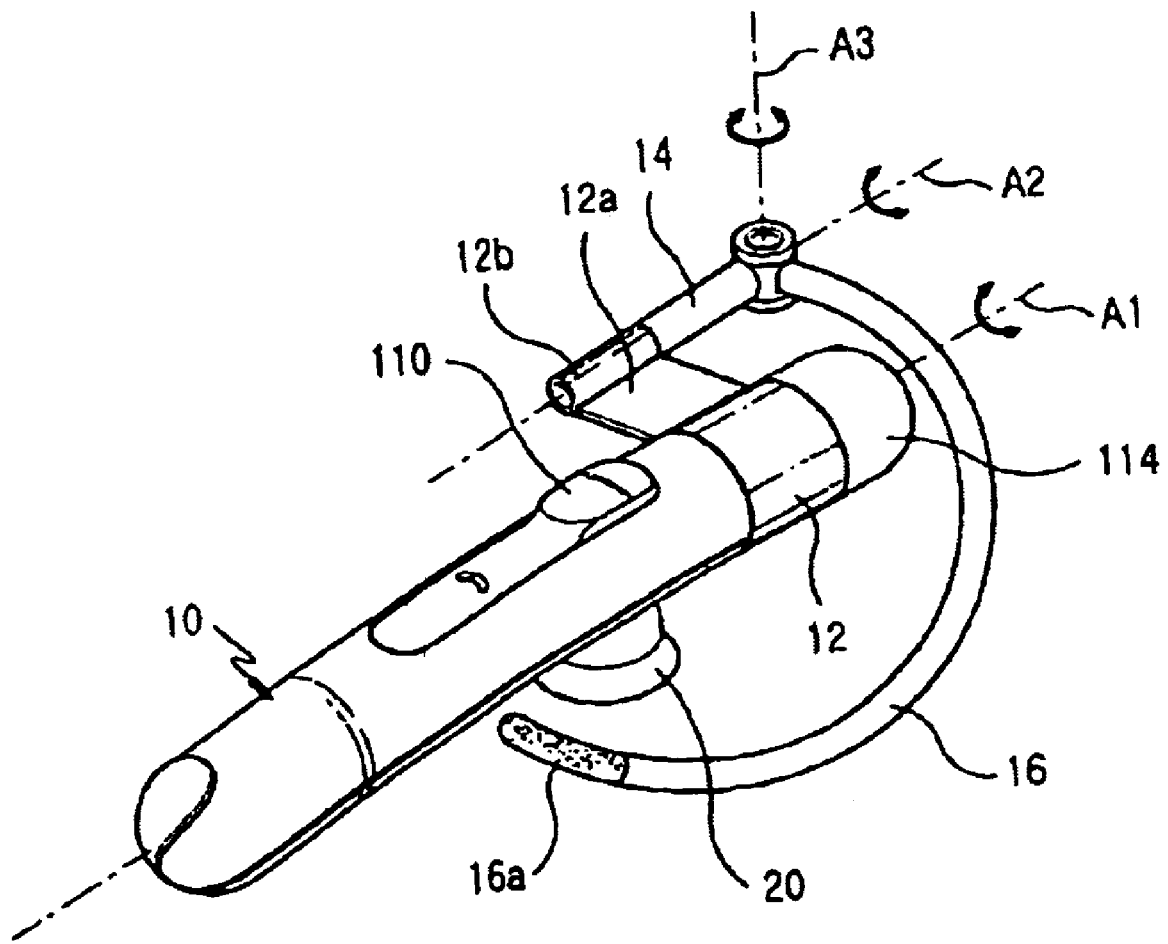
FIGS. 1 and 2 are perspective views respectively showing the structure of a triple-axis rotation type headset according to a preferred embodiment of the present invention.
Figure 2:
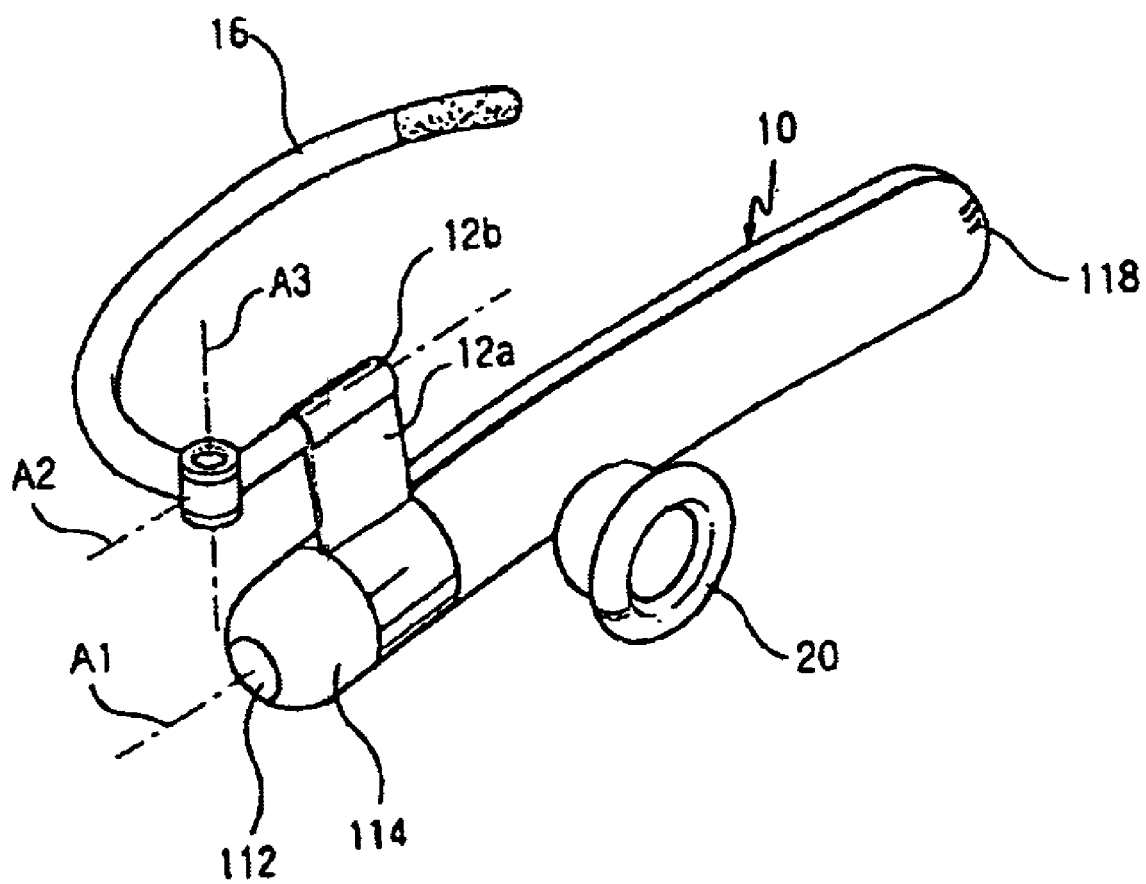
Figure 3:
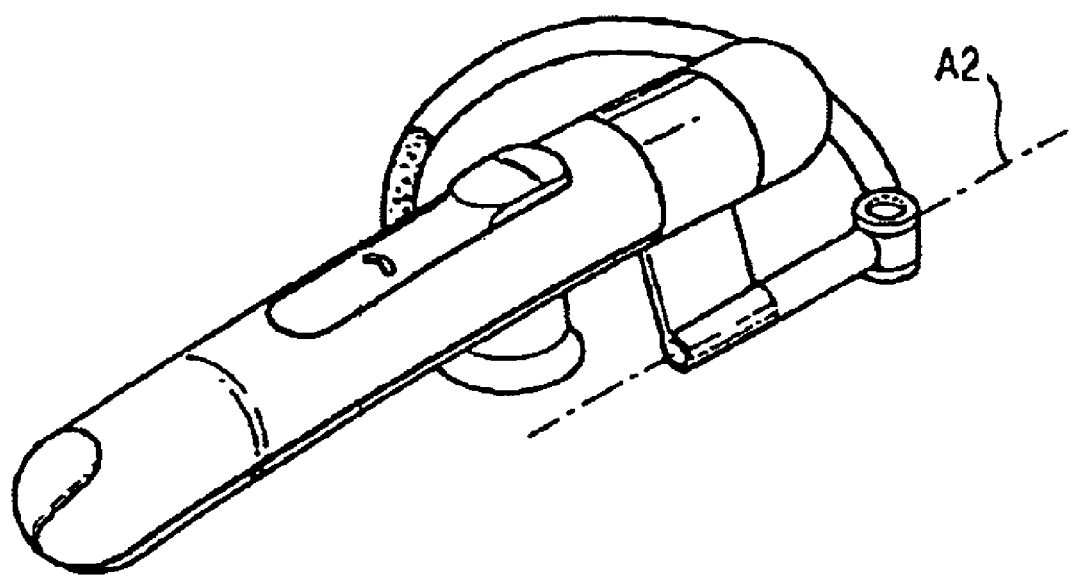
FIGS. 3 and 4 are perspective views of the triple-axis rotation type headset respectively showing the structure of the headset before and after a hanging member of the headset is rotated about a first hinge axis.
Figure 4:
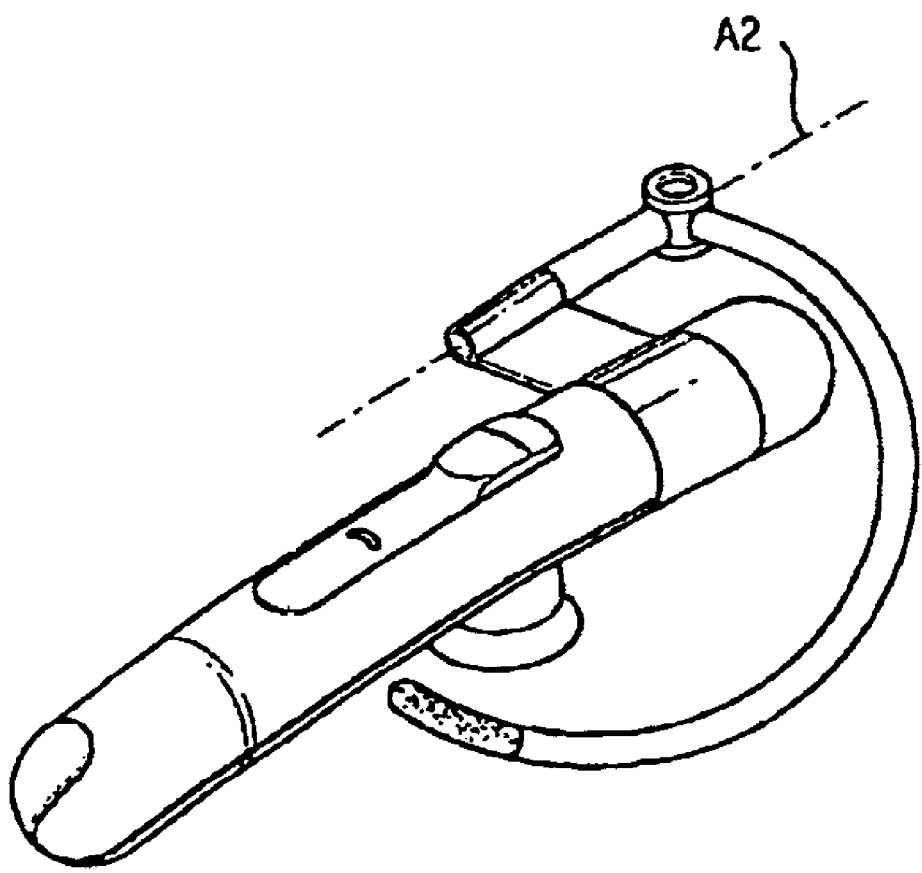

Referring to FIGS. 1 and 2, a wireless headset using a well-known Bluetooth™ module according to the present invention has a characteristic of triple-axis rotation, by which improved contact between the headset and an ear of a user is provided. The headset of the present invention is constructed to rotate about three axes thereof so that the headset is comfortably put on the ear of the user and power and volume keys are conveniently manipulated while the headset is worn on the ear of the user. In other words, the headset of the present invention has three hinge axes.

The headset of the present invention comprises a main housing 10 having a first hinge axis A1 longitudinally extended therethrough, and a rotating housing 12 rotatably attached to the main housing 10 at a prescribed region of the main housing 10. The rotating housing 12 is rotated about the first hinge axis A1. To a tip end of the rotating housing 12, which is furthest from the main housing 10, is rotatably attached a connecting member 14 having a second hinge axis A2 longitudinally extended therethrough. The connecting member 14 is rotated about the second hinge axis A2. To a first end of the connecting member 14, which is opposite to a second end of the connecting member 14 rotatably attached to the rotating housing 12, is rotatably attached a hanging member 16 having a third hinge axis A3 provided at a proximal end thereof.

The main housing 10 is formed in the shape of a rod, preferably in the shape of a cylinder. The main housing 10 is provided at an outer circumference thereof with first and second keys 110, 112 and 114: The rotating housing 12 is rotatably attached to the main housing 10 near one end of the main housing 10. That is to say, the main housing 10 is coaxial with the first hinge axis A1, about which the rotating housing 12 is rotated. On the outer circumference of the main housing 10 is also mounted an earphone 20. The earphone 20 is protruded outwardly from the main housing 10 and provided on the side of the main housing 10 diametrically opposite to the first key 110 of the main housing 10. Preferably, the keys 110, 112 and 114 are respectively provided at the outer circumference of the main housing 10 and at the upper or lower end of the main housing 10. In the drawings, the first key 110 is provided at the outer circumference of the main housing 10, the second key 112 is provided at the lower end of the main housing 10, and a rotary key 114 for adjusting volume is provided at the upper end of the main housing 10. A microphone 118 is preferably positioned in the lower end of the main housing 10.

When the headset of the present invention is put on an ear of a user of the headset, the first key 110 is positioned facing outward, away from the user's face, and the second key 112 faces downward. These positions allow the first, second and third keys 110, 112 and 114 of the headset to be easily and conveniently manipulated when the headset is worn on the ear of the user.

The rotating housing 12 is perpendicularly extended from the outer circumference of the main housing 10. At the tip end of the rotating housing 12 is formed a cylindrical portion 12b. Between the rotating housing 12 and the cylindrical portions 12b is connected a connection plate 12a. The cylindrical portion 12b is coaxial with the second hinge axis A2.

The connecting member 14 is formed in the shape of a straight rod, and also is coaxial with the second hinge axis A2.

The hanging member 16 is rotatably attached to the first end of the connecting member 14, which is opposite to the second end of the connecting member 14 rotatably inserted in the cylindrical portion 12b at the tip end of the rotating housing 12. The hanging member 16 is preferably extended in the shape of a curve corresponding to the shape of an ear of an ordinary person. The hanging member 16 has a distal, free end 16a. The free end 16a of the hanging member 16 is preferably made of a soft material to ensure comfortable contact between the hanging member 16 and the ear of the user of the headset.

Now, interrelations between the hinge axes A1, A2, and A3 provided at the headset of the present invention will be described in detail. The first hinge axis A1 is an axis of rotation about which the cylindrical portion 12b of the rotating housing 12 and the connecting member 14, through which the second hinge axis A2 is longitudinally extended, rotates closer to or away from the head of the user. That is to say, the second hinge axis A2 is spaced apart from the first hinge axis A1 by a prescribed radius of rotation set by the length of the connection plate 12a, while the second hinge axis A2 is parallel with the first hinge axis A1. Consequently, the proximal end of the hanging member 16, at which the third hinge axis A3 perpendicular to the second axis A2 is provided, is also rotated about the first hinge axis A1 by the prescribed radius of rotation.

The second hinge axis A2 is perpendicular to the third hinge axis A3 and intersects the third hinge axis A3 at a point of contact therebetween. The point of contact is provided at the connection of the connecting member 14 and the hanging member 16.

The first hinge axis A1 is parallel with the second hinge axis A2 while the first hinge axis A1 is spaced apart from the second hinge axis A2 at a fixed distance, i.e. the prescribed radius of rotation. The second hinge axis A2 is perpendicular to the third hinge axis A3. The third hinge axis A3 is perpendicular to the first hinge axis A1 while the third hinge axis A3 is spaced apart from the first hinge axis A1 at the fixed distance. Consequently, the first hinge axis A1 and the second hinge axis A2 do not cross each other, and the first hinge axis A1 and the third hinge axis A3 do not also cross each other, although the second hinge axis A2 and the third hinge axis A3 cross each other.

As described above, the headset of the present invention provides three hinge axes: the first hinge axis A1; the second hinge axis A2; the third hinge axis A3, thereby increasing a degree of contact between the headset and an ear of a user of the headset when the headset is put on the ear of the user. In addition, the headset of the present invention provides excellent adaptability, thereby the user controlling the degree of contact between the headset and the ear of the user.

The sequence of putting the headset with the above-stated construction according to the present invention on an ear of a user is as follows: First, the earphone 20 is inserted into the ear. Secondly, the main housing 10 is vertically arranged on the ear. Finally, the hanging member 16 can be hung on the back part of the ear. It should be noted that the hanging member 16 is made of a soft material to further increase the degree of contact between the headset and the ear of the user.

In addition, an upper part of the earphone 20 may be used as a rotary volume controller.

As apparent from the above description, the present invention provides a triple-axis rotation type wireless headset that is capable of rotating about its three axes so that it makes close contact to an ear of a user, thereby increasing a degree of contact between the headset and the ear of the user, a level of comfort upon wearing the headset, and a feeling of stability while the headset is worn on the ear of the user. Furthermore, convenient key manipulation is accomplished while the headset is worn on the ear of the user of the headset.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A triple-axis rotation type wireless headset, comprising:
a main housing having a first hinge axis longitudinally extended therethrough;
a rotating housing rotatably attached to the main housing, the rotating housing being rotatable about the first hinge axis;
a connecting member rotatably attached to the rotating housing, the connecting member having a second hinge axis longitudinally extended therethrough, the connecting member being rotatable about the second hinge axis, the second hinge axis being spaced apart from the first hinge axis; and
a hanging member, having a third hinge axis provided at a proximal end thereof, rotatably attached to a first end of the connecting member about the third hinge axis, the third hinge axis being perpendicular to the second hinge axis.

2. The triple-axis rotation type wireless headset as set forth in claim 1, wherein the first hinge axis is parallel with the second hinge axis, and the second hinge axis intersects the third hinge axis at a point of contact therebetween.

3. The triple-axis rotation type wireless headset as set forth in claim 1, wherein the first hinge axis is perpendicular to the third hinge axis, the first hinge axis being spaced apart from the third hinge axis.

4. The triple-axis rotation type wireless headset as set forth in claim 1, wherein the main housing includes a first key mounted on an outer circumference of the main housing and a second key mounted to one end of the main housing.

5. The triple-axis rotation type wireless headset as set forth in claim 4, wherein the main housing further includes an earphone mounted on the outer circumference of the main housing, the earphone protruding outwardly from the main housing and provided on a side of the main housing diametrically opposite to the first key.

6. The triple-axis rotation type wireless headset as set forth in claim 5, wherein a microphone is provided on the main housing at an other end opposite the second key.

7. The triple-axis rotation type wireless headset as set forth in claim 1, wherein a second end of the connecting member is rotatably connected to an end of the rotating housing.

8. The triple-axis rotation type wireless headset as set forth in claim 1, wherein the main housing is formed in the shape of a rod.

9. The triple-axis rotation type wireless headset as set forth in claim 1, wherein the connecting member is straight and the hanging member is curved.

* * * * *